United States Patent
Li et al.

(10) Patent No.: US 9,249,934 B2
(45) Date of Patent: Feb. 2, 2016

(54) METHOD FOR LOADING AND STORING GAS IN NANO-VALVED SORBENTS

(71) Applicants: Shiguang Li, Mount Prospect, IL (US); Shaojun Zhou, Palatine, IL (US); Howard S. Meyer, Hoffman Estates, IL (US); Miao Yu, Pittsford, NY (US); Moises A. Carreon, Boulder, CO (US)

(72) Inventors: Shiguang Li, Mount Prospect, IL (US); Shaojun Zhou, Palatine, IL (US); Howard S. Meyer, Hoffman Estates, IL (US); Miao Yu, Pittsford, NY (US); Moises A. Carreon, Boulder, CO (US)

(73) Assignees: Gas Technology Institute, Des Plaines, IL (US); University of Louisville Research Foundation, Inc., Louisville, KY (US); University of South Carolina, Columbia, SC (US)

( * ) Notice: Subject to any disclaimer, the term of this patent is extended or adjusted under 35 U.S.C. 154(b) by 95 days.

(21) Appl. No.: 14/262,161

(22) Filed: Apr. 25, 2014

(65) Prior Publication Data
US 2015/0308623 A1    Oct. 29, 2015

(51) Int. Cl.
| | |
|---|---|
| F17C 11/00 | (2006.01) |
| B01J 20/28 | (2006.01) |
| B01J 20/16 | (2006.01) |
| B01J 20/20 | (2006.01) |
| B01J 20/22 | (2006.01) |

(52) U.S. Cl.
CPC .............. *F17C 11/007* (2013.01); *B01J 20/16* (2013.01); *B01J 20/20* (2013.01); *B01J 20/226* (2013.01); *B01J 20/2808* (2013.01); *B01J 20/28016* (2013.01); *B01J 20/28052* (2013.01); *B01J 20/28097* (2013.01); *B01D 2253/25* (2013.01)

(58) Field of Classification Search
CPC ......... F17C 11/007; B01J 20/16; B01J 20/20; B01J 20/226; B01J 20/28016; B01J 20/28052; B01J 20/2808; B01J 20/28097; B01D 2253/25

USPC ......... 95/90, 143; 96/108, 146, 151; 502/526; 206/0.7
See application file for complete search history.

(56) References Cited

U.S. PATENT DOCUMENTS

| | | | |
|---|---|---|---|
| 2003/0153457 A1* | 8/2003 | Nemoto ................. | B01D 53/02 502/402 |
| 2008/0184881 A1* | 8/2008 | Zhou ...................... | B01J 20/226 95/43 |

OTHER PUBLICATIONS

T. Düren et al., "Design of New Materials for Methane Storage", Langmuir, 2004, v. 20, pp. 2683-2689.
H. Furukawa et al., "Storage of Hydrogen, Methane, and Carbon Dioxide in Highly Porous Covalent Organic Frameworks for Clean Energy Applications", Jnl. of the Amer. Chem. Soc., 2009, v. 131, pp. 8875-8883.
H. Furukawa et al., "Ultrahigh Porosity in Metal-Organic Frameworks", Science, Jul. 23, 2010, v. 329, pp. 424-427.

(Continued)

*Primary Examiner* — Frank Lawrence
(74) *Attorney, Agent, or Firm* — Pauley Erickson & Kottis

(57) ABSTRACT

Adsorbent pellets coated with an outer nano-porous layer can be loaded with gas at loading pressures of 250 bar or greater, enabling a much higher loading than can be achieved at low pressures. The nano-porous layer provides nano-valves which can be sealed with an adsorbate such as ethanol or a hydrocarbon to close the nano-valves. The closed nano-valves maintain the high loading pressure inside the adsorbent pellets, and thus maintain the gas loading, during storage of the loaded nano-valved adsorbent pellets at much lower pressure. To release the gas, the nano-porous layer can be heated to a temperature sufficient to vaporize the adsorbate and open the nano-valves.

26 Claims, 1 Drawing Sheet

(56) References Cited

OTHER PUBLICATIONS

S. Ma, et al., "Metal-Organic Framework From an Anthracene Derivative Containing Nanoscopic Cages Exhibiting High Methane Uptake", J. Amer. Chem. Soc., 2008, v. 130, pp. 1012-1016.

J. Mendoza-Cortés et al., "Adsorption Mechanism and Uptake of Methane in Covalent Organic Frameworks: Theory and Experiment", J. Phys. Chem. A, 2010, v. 114, pp. 10824-10833.

J. Mendoza-Cortés et al., "Design of Covalent Organic Frameworks for Methane Storage", J. Phys. Chem. A, 2011, v. 115, pp. 13852-13857.

D. Saha et al., "Adsorption of CO2, CH4, N2O and N2 on MOF-5, MOF-177, and Zeolite 5A", Environ. Science and Techn., 2010, v. 44, pp. 1820-1826.

C.E. Wilmer et al., "Large-Scale Screening of Hypothetical Metal-Organic Frameworks", Nature Chemistry, Feb. 2012, v. 4, pp. 83-89.

Y. Sun et al, "Principles of Methane Adsorption and Natural Gas Storage", Adsorption, 2009, v. 15, pp. 133-137.

Y. Wu, "Methane Storage in Multi-Walled Carbon Nanotubes at the Quantity of 80g", Materials Research Bull., 2008, v. 43, pp. 1431-1439.

Y. Zhou et al., "Storage of Methane on Wet Activated Carbon: Influence of Pore Size Distribution", Carbon, 2004, v. 42, pp. 8-9.

F. Gao et al., "Three-Dimensional Metal-Intercalated Covalent Organic Frameworks for Near-Ambient Energy Storage", Nature, 2013, Article No. 1882, http://www.nature.com/srep/2013/130523/srep01882/full/srep01882.html.

H.J. Lee et al., "Dressed for Combat", Soc. of Chem. Industry, 2009, Issue 7, http://www.soci.org/Chemistry-and-Industry/Cnl-Data/2009/7/Dressed-for-combat.

V.C. Menon et al "Porous Adsorbents for Vehicular Natural Gas Storage: A Review", Jnl of Porous Materials, 1998, v. 5, pp. 43-58.

B. Westenhaus, "A Better Way to Store Natural Gas", http://oilprices.com/Energy/Natural-Gas/A-Better-Way-To-Store-Natural-Gas.html.

Agility Fuel Systems, "Natural Gas Fuels: CNG and LNG, Natural Gas As a Transportation Fuel", http://www.agilityfuelsystems.com/why-natural-gas/lng-vs-cng.html, printed Aug. 6, 2014.

BASF, "Metal Organic Framework Samples", http://www.catalysts.basf.com/p02/USWeb-Internet/catalysts.en/content/microsites/catalysts/prods-inds/energy-storage/MOF-samples, printed Aug. 6, 2014.

Green Car Congress, "COFs Among the Best Adsorbents for Storage of Hydrogen, Natural Gas and CO2", Jun. 7, 2009, http://www.greencarcongress.com/2009/06/cofs-20090607.html.

NGV Global, "New Adsorbed Methane Gas Storage Technology Being Explored", ngvglobal.com, http://www.ngvglobal.com/new-adsorbed-methane-gas-storage-technology-being-explored-1009.

* cited by examiner

METHOD FOR LOADING AND STORING GAS IN NANO-VALVED SORBENTS

FIELD OF THE INVENTION

This invention is directed to a system-level method for loading, storing and releasing gas using nano-valved sorbents.

BACKGROUND OF THE INVENTION

The U.S. Department of Energy ("DOE") has given priority to the development of transformational technologies that reduce the barriers to natural gas use in vehicles. While natural gas enjoys a significant price advantage over gasoline, there are significant technological and economic barriers to its use. These challenges arise largely from the low volumetric energy density of natural gas compared to liquid phase gasoline. Therefore, the suitable on-board storage of methane becomes an important challenge in developing natural gas-powered vehicles.

Technological approaches for storing natural gas on-board have included the storage of liquified natural gas (LNG), compressed natural gas ("CNG") and absorbed natural gas ("ANG"). LNG has been commercially used for heavy-duty vehicles, whereas the storage of CNG has been commercialized for light-duty vehicles. The storage of ANG is developmental, with a Department of Energy target storage pressure of 35 bar.

High surface area adsorbents such as zeolites, metal organic frameworks ("MOF's"), covalent organic frameworks ("COF's"), activated carbon and carbon nanotubes have been investigated for storing natural gas. So far, storage capacities of these adsorbents for methane ($CH_4$) at ambient temperature and 35 bar have been much lower than the DOE ARPA-E (Advanced Research Projects Agency-Energy) targets of 12.5 MJ/L volumetric, and 0.5 grams $CH_4$/gram sorbent gravimetric. Thus far, the reported adsorbent capacities at 35 bar have not exceeded 0.29 grams $CH_4$/gram sorbent. However, the adsorbents are far from saturation and have the potential to adsorb higher levels of methane using higher loading pressures that exceed the 35 bar storage pressure.

There is a need or desire for a method for loading and releasing natural gas and other gases (including, for example, carbon dioxide and hydrogen) into adsorbents that maintains higher loading levels of $CH_4$ at a storage pressure of 35 bar.

SUMMARY OF THE INVENTION

The present invention is directed to a method for loading and storing gas, such as natural gas, carbon dioxide, hydrogen and others. The method includes the step of providing adsorbent pellets (which can be spherical or nano-fiber (like a hollow carbon fiber adsorbent)) coated with a nano-porous outer layer, the nano-porous outer layer including nano-valves capable of being opened and closed on demand. The method also includes the steps of loading the adsorbent pellets with the gas at a loading pressure when the nano-valves are opened, forming loaded nano-valved adsorbent pellets; closing the nano-valves in the loaded nano-valved adsorbent pellets; and storing the loaded nano-valved adsorbent pellets at a storage pressure that is lower than the loading pressure.

The present invention is also directed to a method of storing and releasing gas. The method includes the steps of providing loaded nano-valved adsorbent pellets including a nano-porous outer layer and loaded with the gas, the nano-porous outer layer including nano-valves capable of being opened and closed on demand. The method also includes the steps of storing the loaded nano-valved adsorbent pellets with the nano-valves in a closed position, and opening the nano-valves to release the gas.

The present invention is also directed to a system for on-board storage of gas. The system includes a storage tank including a plurality of zones. The system also includes loaded nano-valved adsorbent pellets coated with a nano-porous outer layer in the zones, the nano-porous outer layer including nano-valves capable of being opened and closed on demand; gas stored in the loaded nano-valved adsorbent pellets in one or more of the plurality of zones, the nano-valves on the loaded nano-valved adsorbent pellets being maintained in a closed position; and a thermal management system capable of independently heating each of the plurality of zones to open the nano-valves and release the gas from the loaded nano-valved adsorbent pellets in the zone.

The invention provides a way of storing gas at elevated internal pressures that greatly exceed the storage pressure of the loaded nano-valved adsorbent pellets. This greatly increases the storage capacity of the adsorbent pellets, and thus the storage capacity of the vehicle, by bringing the amount of stored gas in the adsorbent pellets closer to saturation.

The foregoing and other features and advantages of the invention will become further apparent from the following detailed description of the invention, read in conjunction with the drawings.

DESCRIPTION OF THE INVENTION

In one embodiment, the present invention is directed toward a method for loading and storing gas. The gas can be natural gas or another common gas such as carbon dioxide or hydrogen. The gas can also be selected from a wide variety of known gases, some of which are identified below.

| | | | |
|---|---|---|---|
| Ammonia | $NH_3$ | Nitrous Oxide | $N_2O$ |
| Argon | Ar | Nitrogen Trifluoride | $NF_3$ |
| Allene | $C_3H_4$ | Nitrogen | $N_2$ |
| Arsenic Trifluoride | $AsF_3$ | Oxygen | $O_2$ |
| Arsine | $AsH_3$ | Phosgene | $COCl_2$ |
| Trimethyl Arsine | $As(CH_3)_3$ | PhosphourousTrifluoride | $PF_3$ |
| Diborane | $B_2H_6$ | Phosphorous Pentafluoride | $PF_5$ |
| Pentaborane | $B_5H_9$ | Phosphine | $PH_3$ |
| Boron Trichloride | $BCl_3$ | Sulfur Dioxide | $SO_2$ |
| Bromine | $Br_2$ | Stibine | $SbH_3$ |
| Carbon Dioxide | $CO_2$ | Silane | $SiH_4$ |
| Carbon Monoxide | CO | Disilane | $Si_2H_6$ |
| Carbon Tetrafluoride | $CF_4$ | Silicon Tetrachloride | $SiCl_4$ |
| Chlorine | $Cl_2$ | Silicon Tetrafluoride | $SiF_4$ |
| Chlorine Trifluoride | $ClF_3$ | Sulfur Hexafluoride | $SF_6$ |

-continued

| | | | |
|---|---|---|---|
| Ethylene Oxide | C₂H₄O | Titanium Tetrachloride | TiCl₄ |
| Helium | He | Tungsten Hexafluoride | WF₆ |
| Hexafluoroethane | C₂F₆ | Uranium Hexafluoride | UF₆ |
| Hydrogen | H₂ | Vinyl Bromide | C₂H₃Br |
| Hydrogen Bromide | HBr | Vinyl Fluoride | C₂H₃F |
| Hydrogen Chloride | HCl | Vinyl Chloride | C₂H₃Cl |
| Hydrogen Fluoride | HF | Trimethyl Gallium | Ga(CH₃)₃ |
| Hydrogen Sulfide | H₂S | Triethyl Gallium | Ga(C₂H₅)₃ |
| Molybdenum Hexafluoride | MoF₆ | Trimethyl Indium | In(C₂H₅)₃ |
| Nitric Oxide | NO | | |

Figure 1:
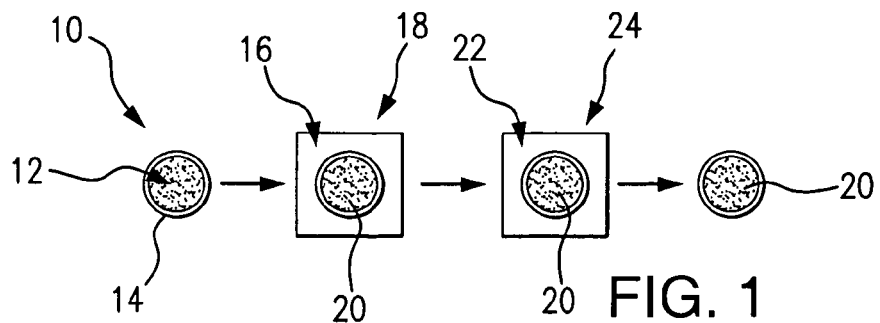
FIG. 1 schematically illustrates a method of the invention for loading and storing gas.

Referring to FIG. 1, the method 10 includes the step of providing adsorbent pellets 12 coated with a nano-porous outer layer 14 that includes nano-valves capable of being opened and closed on demand. Suitable adsorbent pellets 12 can be formed of a carbon-based material, a metal-organic framework, a covalent-organic framework, a zeolite, or a combination of the foregoing. Suitable carbon-based adsorbent materials include activated carbon and carbon-based nanotubes.

Metal organic frameworks (MOF's) are crystalline compounds of metal ions or clusters coordinated to rigid organic molecules to form porous structures. The organic molecules are typically monovalent, divalent, trivalent or tetravalent ligands.

Covalent organic frameworks (COF's) are crystalline extended organic structures in which the building blocks are linked by strong covalent bonds. COF's are porous, crystalline, and made entirely of light elements (hydrogen, boron, carbon, nitrogen and oxygen) that are known to form strong covalent bonds.

Zeolites are a family of hydrous aluminum silicate materials whose molecules enclose cations of sodium, potassium, calcium, magnesium, strontium or barium. Examples include analcime, chabazite, clinoptilolite, heulandite, natrolite, phillipsite and stilbite, which occur naturally.

The adsorbent pellets 12 are suitably porous and should have a pellet diameter of about 0.1 to about 1 centimeter, suitably about 0.1 to about 0.2 centimeter. The nano-porous outer layer 14 is coated onto the outer surface of adsorbent pellets 12 and includes nano-pores that act as nano-valves capable of being opened and closed on demand. The nano-porous outer layer 14 can be formed of a polymer, an inorganic material, or a mixture of organic and inorganic materials. Suitable coating materials include without limitation Al₂O₃, SiO₂, TiO₂, ZrO₂, zeolites, molecular sieves, and combinations thereof. The nano-porous outer layer 14 should have a thickness of about 1 to about 100,000 nanometers, suitably about 10 to about 10,000 nanometers, and a mean pore size of about 0.1 to about 5 nanometers, suitably about 0.3 to about 1 nanometer. The nano-porous outer layer 14 can be coated onto the adsorbent pellets 12 by various coating technologies including without limitation chemical vapor deposition, molecular layer deposition, atomic layer deposition, sol gel process, and the like.

The pores in the nano-porous outer layer 14 act as nano-valves that are capable of being opened and closed on demand. To close the nano-valves, the nano-porous outer layer 14 can be covered and sealed with an adsorbate. The adsorbate can be alcohols such as ethanol, 1-propanal and 1-butanol; various hydrocarbons such as hexane and 2,2-dimethyl butane; or another suitable liquid such as acetone, propionaldehyde and methyl acetate. The adsorbate forms nano-droplets that enter and seal the pores in the nano-porous outer layer 14, effectively closing the nano-valves. The nano-droplets adapt to the size of the nano-valves and typically have a kinetic diameter of about 0.1 to about 5 nanometers, or about 0.3 to about 1 nanometer. The nano-valves can be reopened by heating the nano-porous outer layer 14 to a temperature sufficient to vaporize the adsorbate. Depending on the adsorbate used, the nano-porous layer 14 can be heated to a temperature of about 50 to about 100° C., suitably about 55 to about 85° C.

The method of the invention includes the step of loading the adsorbent pellets with gas at a loading pressure when the nano-valves are opened, forming loaded nano-valved adsorbent pellets. Referring to FIG. 1, the coated adsorbent pellets are transferred to a closed chamber 16, into which natural gas 18 or another gas is injected at a loading pressure to form loaded nano-valved adsorbent pellets 20. The loading pressure can be whatever pressure is needed to optimize the gas adsorption of the coated adsorbent pellets, and can be much higher than the ultimate storage pressure of the loaded nano-valved adsorbent pellets 20. The loading pressure can be at least about 150 bar, or at least about 200 bar, or at least about 250 bar, or about 250-300 bar or higher depending on the specific gas and the adsorption characteristics of the adsorbent pellets 14.

Next, the loaded nano-valved adsorbent pellets 20 are transferred under pressure to an adsorbate chamber 22 into which an adsorbate 24 is injected to close the nano-valves and seal the loaded nano-valved adsorbent pellets 20. Alternatively, the adsorbate 24 can be supplied to the same chamber 16 that is used to load the adsorbent pellets with natural gas or another gas. The adsorbate 24, when used to close the nano-valves, can maintain an internal pressure in the loaded nano-valved adsorbent pellets 20 that is about as high as the loading pressure, in order to maximize the storage and prevent the escape of natural gas. The loaded nano-valved adsorbent pellets 20 are then removed from the adsorbate chamber 22 for further use, and are typically stored at a much lower storage pressure. For natural gas, the lower pressure can range from atmospheric pressure to about 35 bar, which is the DOE's target storage pressure for adsorbed natural gas.

During storage of the loaded nano-valved adsorbent pellets 20, the closed nano-valves sealed by the adsorbate can maintain a large pressure differential between the internal pressure of the loaded nano-valved adsorbent pellets 20 and the external storage pressure. The pressure differential can be at least about 50 bar, and can be as high as 250-300 bar or higher. The theoretical maximum pressure differential that can be maintained by the closed nano-valves can be estimated according to the following equation:

$$\Delta P = 2\gamma \cos \theta / r$$

where $\Delta P$ is the pore entry pressure,
$\gamma$ is the liquid surface tension of the adsorbate,
$\theta$ is the contact angle, and
r is the pore radius.

Based on the foregoing equation, the estimated maximum pressure drop for condensed ethanol adsorbate in 0.4-1.0 nm pores of the nano-porous coating layer 14 is at least about 250 bar at 20° C.

The invention is also directed to a method for storing and releasing gas. The method includes the step of providing loaded nano-valved adsorbent pellets 20 including a nano-porous outer layer 14 and loaded with natural gas or another gas, as explained above, with the nano-porous outer layer 14 including nano-valves capable of being opened and closed on demand. The loaded nano-valved adsorbent pellets 20 are stored with the nano-valves being closed. This is accomplished using the adsorbate 24 to seal the nano-valves under the loading pressure as described above, and then storing the loaded nano-valved adsorbent pellets 20 at a lower storage pressure. When the natural gas or other gas is needed for an end use, the nano-valves can then be opened as described above by heating the nano-porous outer layer 14 to a temperature sufficient to vaporize the adsorbate from the nano-valves.

Figure 2:
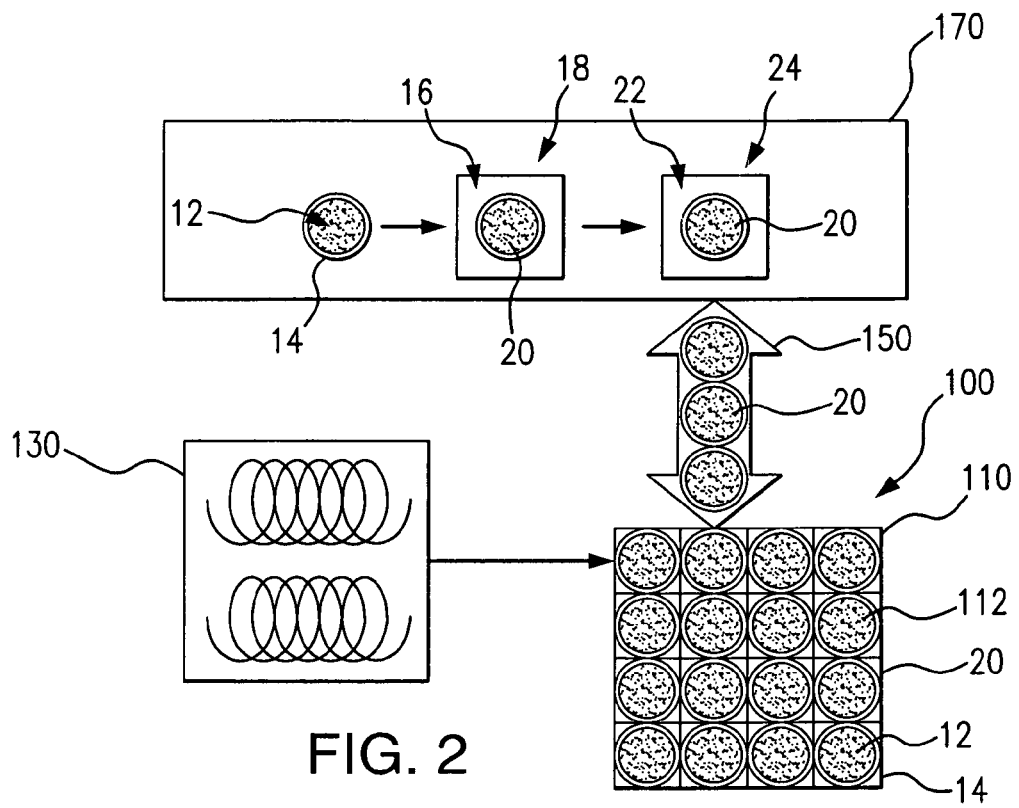
FIG. 2 schematically illustrates a system for on-board storage of gas, and the interplay between the system and methods of the invention.

The invention is also directed to a system for on-board storage of gas. Referring to FIG. 2, system 100 includes a storage tank 110 that is divided into a plurality of zones 112, with sixteen of the zones 112 being shown. Each zone 112 includes one or more loaded nano-valved adsorbent pellets 20 having a nano-porous outer layer 14, the nano-porous outer layer 14 including nano-valves capable of being opened and closed on demand. Natural gas or another gas is stored in the loaded nano-valved adsorbent pellets 20 in one or more of the plurality of zones 112, with the nano-valves on the loaded nano-valved adsorbent pellets 20 being maintained in a closed position.

The storage tank 110 can be maintained on-board, for example on a natural gas powered vehicle or other natural gas powered device. The system 100 includes a thermal management system 130 capable of independently heating each of the plurality of zones 112 to open the nano-valves and release the gas from the loaded nano-valved adsorbent pellets 20 in the zone. Each of the plurality of zones 112 can be independently heated, as needed, to a temperature sufficient to vaporize the adsorbate that closes and seals the nano-valves, thus releasing the natural gas for use by the vehicle. Either one, or more than one zone 112 can be simultaneously heated depending on the need for gas consumption. As the gas is consumed, selective zones 112 can be individually and sequentially heated to release additional gas for consumption. The storage tank 110 and zones 112 can be maintained at a storage pressure up to the DOE standard of 35 bar. The internal pressure inside the loaded nano-valved adsorbent pellets 20 can be much higher, as explained above.

As the loaded nano-valved adsorbent pellets 20 become spent due to the release of the natural gas or other gas, they need to be replaced and/or re-charged with the gas. As shown in FIG. 2, the system 100 can also include a gas transfer unit 150 for loading natural gas or another gas under pressure into each of the plurality of zones 112. In the embodiment shown, the transfer unit 150 operates as a two-way conveyor that transfers spent nano-valved adsorbent pellets away from one or more of the zones 112 of storage tank 110 and, subsequently, transfers new fully loaded nano-valved adsorbent pellets 20 into the one or more zones 112.

The system 100 shown in FIG. 2 can be affiliated with a charging unit 170, which can be a home charging unit. The charging unit 170 receives spent nano-valved adsorbent pellets from the transfer unit 150, and/or new nano-valved adsorbent pellets from a source, and charges them with natural gas or another gas to form loaded nano-valved adsorbent pellets 20 which can then be transferred to the storage tank 110 via the transfer unit 150. The internal elements of the charging unit 170 are similar to the apparatus described with respect to FIG. 1. Adsorbent pellets 12 having a nano-porous outer layer 14 enter chamber 16 and are loaded with natural gas 18 or another gas under pressure to form loaded nano-valved adsorbent pellets 20. Next, the loaded nano-valved adsorbent pellets 20 are transferred under pressure to an adsorbate chamber 22, into which an adsorbate 24 is injected to close and seal the nano-valves. The loaded nano-valved adsorbent pellets 20 are then ready for storage at up to 35 bar, or transfer to the storage tank 110 via the transfer unit 150.

Figure 3:
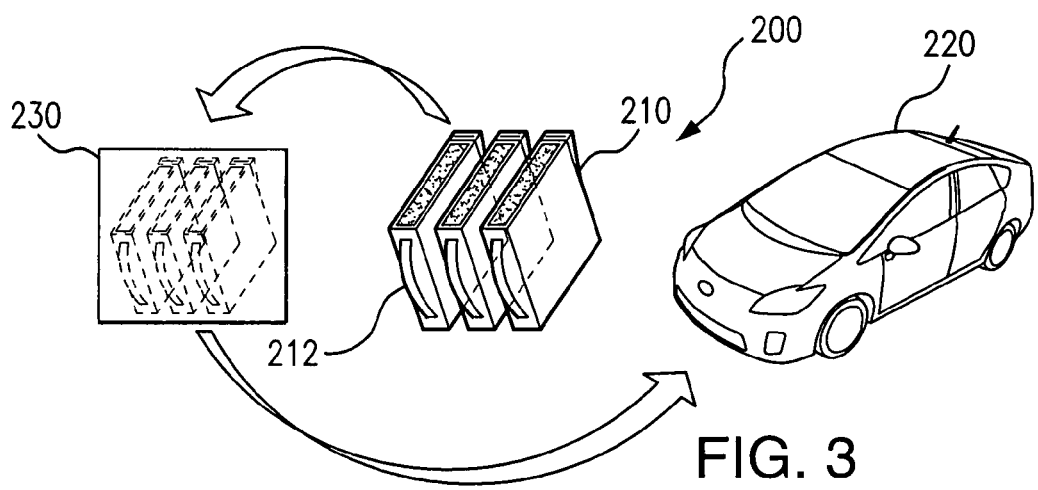
FIG. 3 schematically illustrates another system for on-board storage of gas which provides for convenient and efficient re-charging.

FIG. 3 illustrates a system 200 for on-board storing of natural gas which provides for convenient re-charging of the nano-valved adsorbent pellets 20. The nano-valved adsorbent pellets 20 are stored in one or more thin-walled conformable cartridge-type tanks 210 which can be easily inserted and removed from a vehicle 220 using handles 212. When the nano-valved adsorbent pellets in one or more of the thin-walled cartridges 210 become depleted, the thin-walled cartridges 210 can be manually transferred to a thick-walled charging tank 230 for recharging with gas under high pressure. Then, the thin-walled cartridges 210 filled with the freshly re-charged nano-valved adsorbent pellets 20 can be manually transferred from the charging tank 230 back to the vehicle 220. The thin-walled cartridges 210 contain suitable openings which facilitate the use of gas in the vehicle 220 and the re-charging of nano-valved adsorbent pellets in the charging tank 230.

EXAMPLES

Example 1

Anticipated Energy Densities

The maximum absorption capacity of various covalent organic frameworks and metal organic frameworks at 25° C. and pressures up to 300 bar are known from literature. Among them, a metal organic framework known as MOF-177, and covalent organic frameworks known as COF-102 and COF-105-Eth-trans have high adsorption capacities at higher pressures. As shown in Table 1 below, coating these adsorbent materials with a nano-porous outer coating layer and loading them with $CH_4$ at 25° C. and at a pressure of 250 bar results in energy densities that exceed the DOE's targets for natural gas of greater than 12.5 MJ/L (volumetric energy density) and greater than 0.5 g $CH_4$/g sorbent (gravimetric energy density).

TABLE 1

Energy Densities of Loaded Nano-Valved Adsorbent Materials

| Adsorbent Material | Crystal Density (g/ml) | Energy Density At 250 Bar | | Energy Density at 300 Bar | |
|---|---|---|---|---|---|
| | | Volumetric MJ/L | Gravimetric g $CH_4$/ g sorbent | Volumetric MJ/L | Gravimetric g $CH_4$/ g sorbent |
| MOF-177 | 0.42 | 12.7 | 0.54 | 13.3 | 0.56 |
| COF-102 | 0.42 | 13.0 | 0.56 | 13.5 | 0.58 |
| COF-105-Eth-trans | 0.26 | 13.2 | 0.91 | 13.9 | 0.96 |

Example 2

Synthesis Procedure for Nano-Valved 5A Sorbents

A solution referred to as Mobil Composition of Matter (MCM)-48 was prepared by dissolving sodium hydroxide and cetyltrimethylammonium bromide (CTAB) in deionized water at 40° C. The mixture was stirred for 30 minutes before adding Tetraethy ortosilicate (TEOS). The molar compositional ratio of the solution was 1.0 TEOS:0.48 CTAB:0.46 NaOH:56 1120. The solution was stirred for another 60 minutes, and then was transferred (~25 ml) to an autoclave, in which about 5 grams of 5A beads (2.5-mm-diameter zeolite spheres from W.R. Grace & Co.) were placed. The MCM-48 solution and the pellets were hydrothermally treated at 100° C. for 72 hours. Then, the coated pellets were removed from the autoclave, washed gently with water, and dried at 120° C. overnight. A second MCM-48 layer was applied as described above. Finally, the template (CTAB) was removed by calcination. In the calcination procedure, the MCM-48-5A coated pellets were heated at 0.7° C./min and calcined at 450° C. for 4 hours and cooled down to room temperature at 1° C./min.

The calcined samples were outgassed at 200° C. for 4 hours. Then, alucone molecular layer deposition (MLD) films were prepared by using trimethylaluminum ($Al(CH_3)_3$; 97%, Sigma Aldrich) and ethylene glycol ($HO(CH_2)_2OH$; 99%, Alfa Aesar). Each alucone MLD cycle started with 240 second vacuum. Then, ethylene glycol was diffused into the reactor with a partial pressure of 50 mTorr and settled for 120 seconds, followed by 240 seconds vacuum to evacuate extra unreacted ethylene glycol. Ultrahigh purity $N_2$ (Airgas) was used to purge at 20 sccm for 30 seconds. Then, 240 seconds vacuum was applied to evacuate $N_2$. After that, TMA was diffused into the reactor with a partial pressure of 300 mTorr and settled for 120 seconds, followed by 240 seconds vacuum to evacuate extra unreacted TMA. Ultrahigh purity $N_2$ (Airgas) was used as the purge at 20 sccm for 30 second. Then 240 second vacuum was applied to evacuate $N_2$. Four cycles alucone MLD were deposited on the zeolite sample at 100° C. Then the coated samples were heated in air from room temperature to 250° C. at a rate of $1°$ C./min$^{-1}$, kept at 250° C. for 4 hours, and then cooled to room temperature at the same rate.

Example 3

High Pressure Valve Functioning Testing Data

High pressure valve functioning testing includes the following 4 steps:
Load $CH_4$ by adsorption at high pressure,
Seal $CH_4$ in the valved sorbents by introducing adsorbate into the nano pores of the coating layer,
Release pressure and leave the samples at ambient pressure for 0.5 h, and
Heat up the sorbents to 150° C., and then cool down to room temperature.

The high pressure valve functioning test for the two-layer MCM-48 coated 5A adsorbents with a $CH_4$ loading pressure of 200 bar showed the amount of stored CIH at storage pressure was 48.6 V/V, 61% of the maximum uncoated capacity (79 V/V).

The embodiments of the invention described herein are presently preferred. Various modifications and improvements can be made without departing from the spirit and scope of the invention. The scope of the invention is indicated by the appended claims, and all changes that fall within the scope of equivalents are embraced therein.

We claim:

1. A method for loading and storing gas, comprising the steps of:
providing adsorbent pellets coated with a nano-porous outer layer, the nano-porous outer layer including nano-valves capable of being opened and closed on demand;
loading the adsorbent pellets with gas at a loading pressure when the nano-valves are opened, forming loaded nano-valved adsorbent pellets;
closing the nano-valves in the loaded nano-valved adsorbent pellets; and
storing the loaded nano-valved adsorbent pellets at a storage pressure that is lower than the loading pressure.

2. The method of claim 1, wherein the step of closing the nano-valves comprises the step of sealing the nano-porous outer layer with an adsorbate.

3. The method of claim 2, wherein the adsorbate comprises ethanol or a hydrocarbon.

4. The method of claim 1, wherein the loaded nano-valved adsorbent pellets have an internal pressure that is higher than the storage pressure, and the closed nano-valves maintain a pressure differential between the internal pressure and the storage pressure.

5. The method of claim 1, further comprising the step of opening the closed nano-valves to release the gas from the loaded nano-valved adsorbent pellets.

6. The method of claim 1, wherein the adsorbent pellets comprise a zeolite.

7. The method of claim 1, wherein the adsorbent pellets comprise a carbon-based material.

8. The method of claim 1, wherein the adsorbent pellets comprise a metal-organic framework.

9. The method of claim 1, wherein the adsorbent pellets comprise a covalent-organic framework.

10. The method of claim 1, wherein the nano-porous outer layer has an average pore size of about 0.3 nanometers to about 1 nanometer.

11. The method of claim 4, wherein the pressure differential is at least about 50 bar.

12. The method of claim 1, wherein the loading pressure is at least about 250 bar.

13. The method of claim 12, wherein the storage pressure is about 35 bar or less.

14. The method of claim 1, wherein the loaded nano-valved adsorbent pellets are stored in one or more conformable cartridge-type tanks.

15. A method for storing and releasing gas, comprising the steps of:
providing loaded nano-valved adsorbent pellets including a nano-porous outer layer and loaded with gas, the nano-porous outer layer including nano-valves capable of being opened and closed on demand;
storing the loaded nano-valved adsorbent pellets with the nano-valves being closed; and
opening the nano-valves to release the gas.

16. The method of claim 15, wherein the nano-valves are maintained in a closed position by sealing the nano-porous outer layer with an adsorbate.

17. The method of claim 16, wherein the nano-porous outer layer comprises pores having an average diameter of about 0.3 nanometers to about 1 nanometer.

18. The method of claim 17, wherein the adsorbate comprises liquid molecules having a kinetic diameter of about 0.3 nanometers to about 1 nanometer.

19. The method of claim 15, wherein the step of opening the nano-valves comprises heating the nano-porous outer layer to a temperature of about 55° C. to about 85° C.

20. The method of claim 15, wherein the adsorbent pellets comprise a zeolite, a carbon-based material, a metal-organic framework, a covalent-organic framework, or a combination thereof.

21. The method of claim 15, wherein the nano-valves are maintained in a closed position by sealing with a liquid, and the step of opening the nano-valves comprises the step of vaporizing the liquid.

22. A system for on-board storage of gas, comprising:
a storage tank including a plurality of zones;
loaded nano-valved adsorbent pellets including a nano-porous outer layer in the zones, the nano-porous outer layer including nano-valves capable of being opened and closed on demand;
gas stored in the loaded the nano-valved adsorbent pellets in one or more of the plurality of zones, the nano-valves on the loaded nano-valved adsorbent pellets being maintained in a closed position; and
a thermal management system capable of independently heating each of the plurality of zones to open the nano-valves and release gas from the loaded nano-valved adsorbent pellets in the zone.

23. The system of claim 22, further comprising a gas transfer unit for loading gas under pressure into each of the plurality of zones.

24. The system of claim 23, wherein the gas transfer unit comprises apparatus for transferring loaded nano-valved adsorbent pellets into one or more of the plurality of zones.

25. The system of claim 24, wherein the gas transfer unit comprises one or more cartridges, each one including a plurality of nano-valved adsorbent pellets, which can be manually transferred back and forth between a vehicle and a charging tank.

26. A method for loading and storing gas, comprising the steps of:
providing adsorbent pellets coated with a nano-porous outer layer, the nano-porous outer layer including nano-valves capable of being opened and closed on demand;
storing the adsorbent pellets in one or more cartridge-type tanks, each tank containing a plurality of the adsorbent pellets;
loading the adsorbent pellets in the cartridges with gas at a loading pressure when the nano-valves are opened, forming loaded nano-valved adsorbent pellets in the cartridges;
closing the nano-valves in the loaded nano-valved adsorbent pellets; and
storing the cartridges containing the loaded nano-valved adsorbent pellets at a storage pressure that is lower than the loading pressure.

* * * * *